No. 858,729. PATENTED JULY 2, 1907.
G. W. LEDBETTER & N. LANPHER.
CHURN.
APPLICATION FILED APR. 4, 1907.
2 SHEETS—SHEET 1.
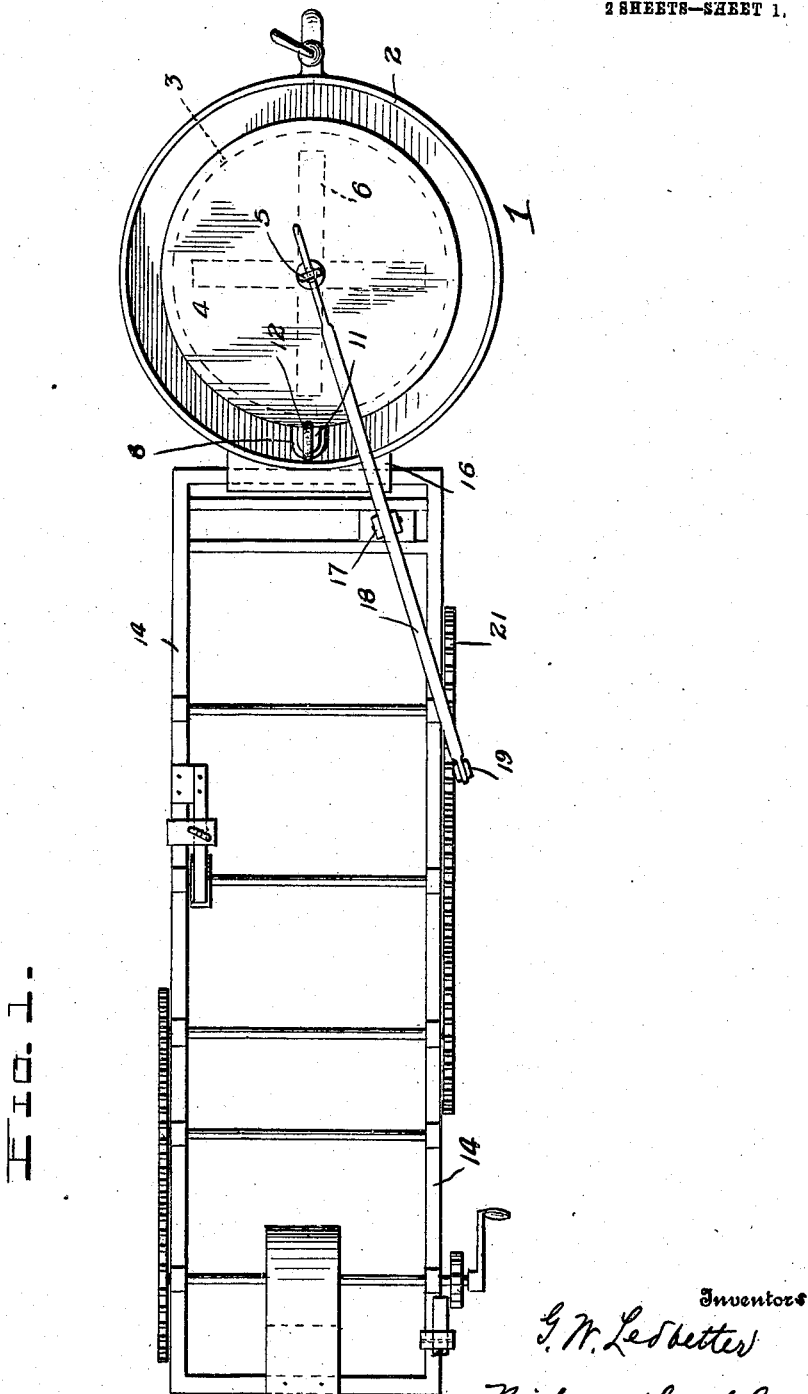

No. 858,729. PATENTED JULY 2, 1907.
G. W. LEDBETTER & N. LANPHER.
CHURN.
APPLICATION FILED APR. 4, 1907.
2 SHEETS—SHEET 2.
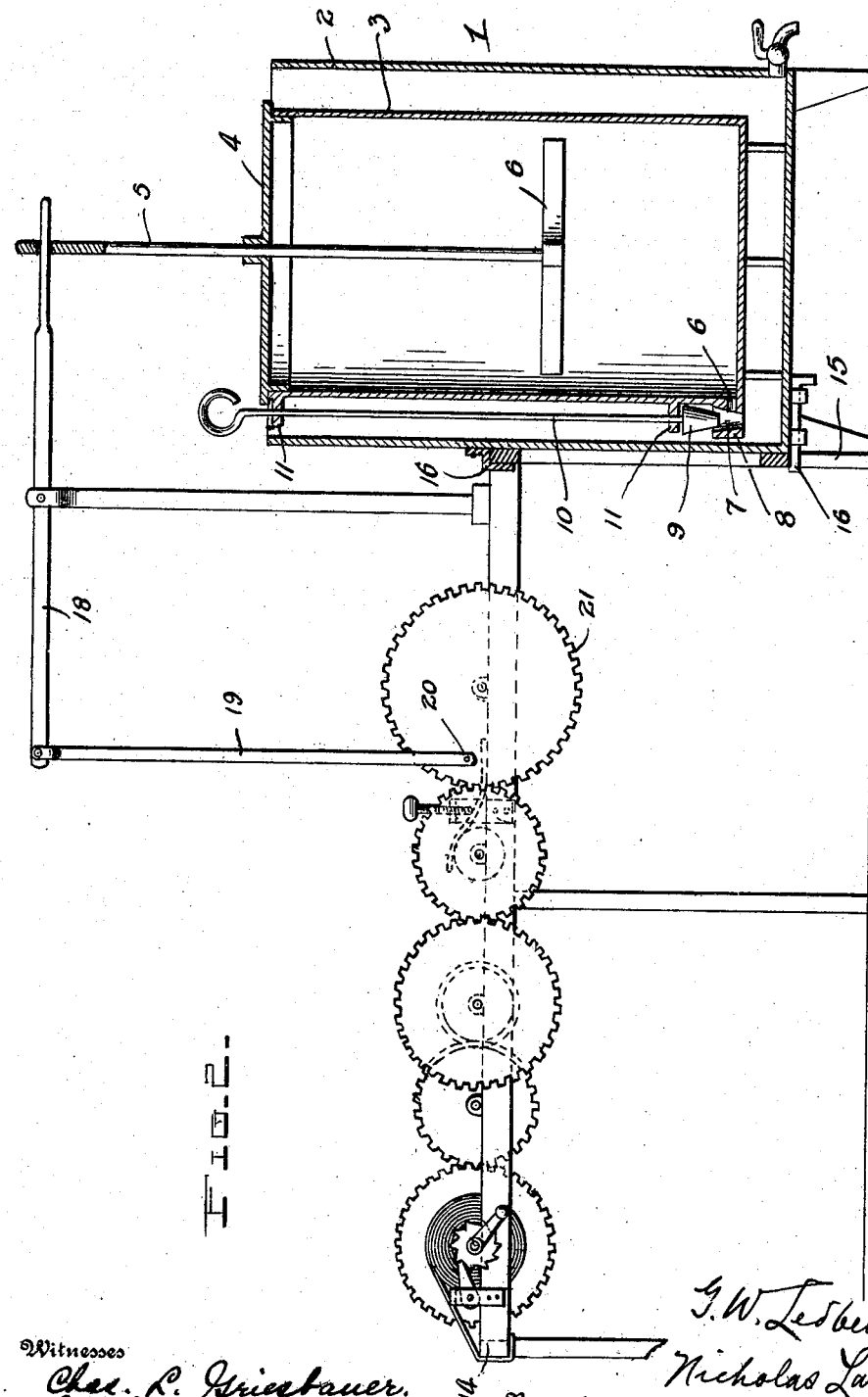

UNITED STATES PATENT OFFICE.

GEORGE WASHINGTON LEDBETTER, OF NEAR ADVANCE, AND NICHOLAS LANPHER, OF BOLLINGER COUNTY, MISSOURI.

CHURN.

No. 858,729.      Specification of Letters Patent.      Patented July 2, 1907.

Application filed April 4, 1907. Serial No. 366,333.

*To all whom it may concern:*

Be it known that we, GEORGE WASHINGTON LEDBETTER, residing near Advance, in the county of Stoddard, and NICHOLAS LANPHER, residing in Bollinger county, and State of Missouri, citizens of the United States, have invented certain new and useful Improvements in Churns, of which the following is a specification, reference being had therein to the accompanying drawing.

This invention relates to improvements in churns.

The object of the invention is to provide a device of this character which will be of simple, strong, durable and comparatively inexpensive construction and very effective for the purpose intended.

With the above and other objects in view, the invention consists in the novel construction, combination and arrangement of parts hereinafter described and claimed, and illustrated in the accompanying drawings, in which Figure 1 is a top plan view of my improved churn and a motor for operating the same; and Fig. 2 is a vertical section through the churn, the motor being shown in elevation.

Referring to the drawings by numeral, 1 denotes our improved churn which consists of an outer receptacle 2 suitably pivoted upon legs and an inner receptacle 3 supported within and spaced from the sides and bottom of the receptacle 2. The milk or cream to be churned is placed in the inner receptacle or chamber 3 and its top is closed by a removable cover 4 through which slides a vertical rod 5 having a dasher 6 at its lower end. The outer receptacle 2 is employed for drawing off the buttermilk after the churning operation has been completed, and to accomplish this, we form at the bottom of the receptacle 3 a drain or outlet passage 6. The latter opens into a vertically extending cone shaped opening 7 which is formed in a laterally projecting offset 8 upon the receptacle 3 and which is adapted to serve as a seat for a tapered valve plug or stopper 9 secured upon the lower end of a vertical operating rod or stem 10. This rod 10 extends between the vertical walls of the inner and outer receptacles and slides in suitable guides 11 which also limit its movement. Upon its upper end is a suitable handle 12 by means of which it may be operated to open and close the passages 6, 7, as will be readily understood upon reference to Fig. 2.

While the churn may be operated in any suitable manner, I preferably employ a spring motor such as the one illustrated. This motor comprises a frame 14 to one end of which the churn may be secured, as shown at 16. Arising from the frame 14 is an upright 17, in the top of which is pivoted a lever 18. One end of the latter is pivotally connected to the dasher rod 5 and its other end is connected by a pitman 19 to a crank pin 20 on a gear or driving wheel 21 of the motor.

Having thus described our invention what we claim and desire to secure by Letters Patent is:

1. A churn comprising an outer receptacle having an outlet adjacent to its bottom, an inner receptacle arranged within and spaced from the bottom and sides of the outer one, an outlet for said inner receptacle arranged at its bottom and opening into said outer receptacle, a removable closure for the last mentioned outlet, means for operating said closure, a cover upon said inner receptacle, a dasher within the latter, a rod connected to said dasher and slidable through said cover, a frame, a standard thereon and a lever pivoted upon said standard and pivotally connected to said dasher rod.

2. A churn comprising spaced inner and outer receptacles, the inner one having at its bottom a laterally projecting offset formed with a vertical tapered aperture and with a lateral passage affording communication between the interior of the inner receptacle and said vertical aperture, guides, a rod slidable in said guides, and a tapered plug upon the lower end of said rod and adapted to enter said vertical aperture to close the same and said passage.

In testimony whereof we hereunto affix our signatures in presence of two witnesses.

his
      GEORGE WASHINGTON × LEDBETTER.
                              mark.
      NICHOLAS LANPHER.

Witnesses:
    EDWARD LANSON PETTER,
    GEORGE H. RETHERFORD.